United States Patent [19]

Sitton

[11] Patent Number: 5,024,020

[45] Date of Patent: * Jun. 18, 1991

[54] SUPER SETTER PLASTIC FISHING HOOK

[76] Inventor: Gary L. Sitton, 6025 Pinkstaff, Beaumont, Tex. 77006

[*] Notice: The portion of the term of this patent subsequent to May 30, 2006 has been disclaimed.

[21] Appl. No.: 611,742

[22] Filed: May 18, 1984

Related U.S. Application Data

[63] Continuation-in-part of Ser. No. 483,719, Apr. 11, 1983.

[51] Int. Cl.⁵ .............................................. A01K 83/00
[52] U.S. Cl. ...................................... 43/43.16; 43/44.8
[58] Field of Search .................. 43/43.16, 15, 5, 53.5, 43/28, 44.8

[56] References Cited

U.S. PATENT DOCUMENTS

| | | | |
|---|---|---|---|
| 842,594 | 1/1907 | Van Vleck | 43/43.16 |
| 2,511,117 | 6/1950 | Loeb | 43/42.37 |
| 2,598,011 | 5/1952 | Pitre | 43/44.8 |
| 2,995,858 | 8/1961 | Rathman | 43/44.8 |
| 3,399,482 | 9/1968 | Cox | 43/15 |
| 3,724,116 | 4/1973 | Lindner et al. | 43/44.8 |
| 3,834,060 | 9/1974 | Wagenknecht | 43/44.8 |
| 4,334,381 | 6/1982 | Carver | 43/44.8 |

Primary Examiner—Kurt Rowan
Attorney, Agent, or Firm—Vaden, Eickenroht, Thompson & Boulware

[57] ABSTRACT

A monolithic molded plastic fishing hook connectable to a monofilament fishing line. The hook by its unique parts is arranged to provide a shock absorber action during catching fish, to release from a hooked snag before the line breaks, and to maintain the axis of penetration of the barbed point substantially parallel to the line of action while under tension.

1 Claim, 3 Drawing Sheets

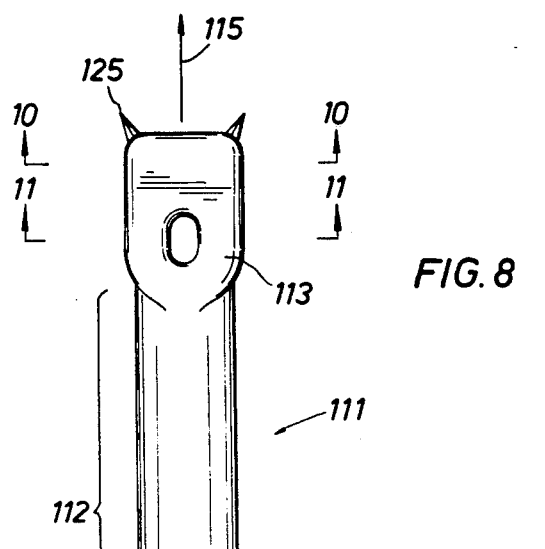
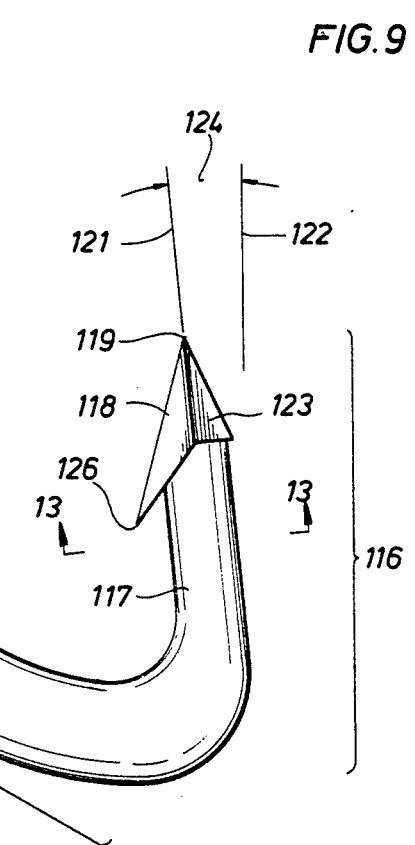
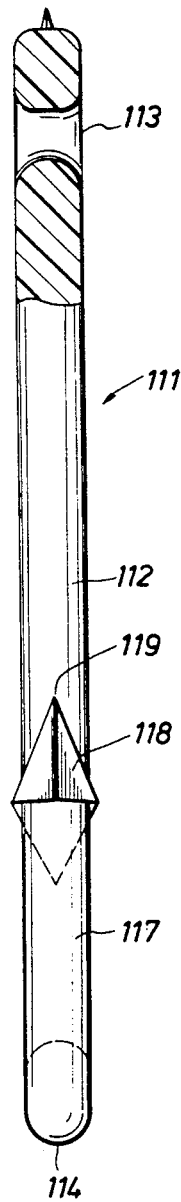
FIG. 8
FIG. 9
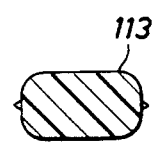
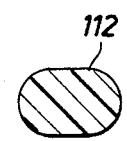
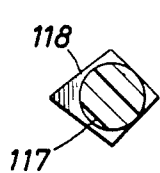
FIG. 10   FIG. 12   FIG. 11   FIG. 13

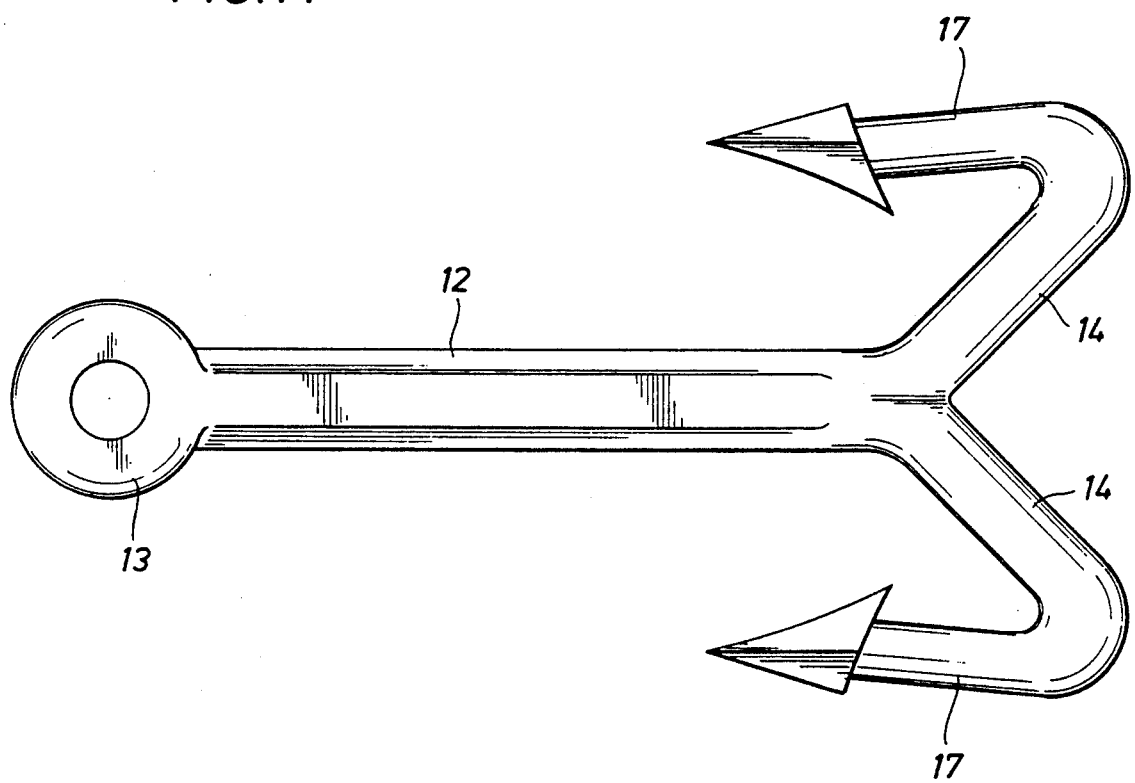

SUPER SETTER PLASTIC FISHING HOOK

This application is a continuation-in-part of co-pending patent application, Ser. No. 483,719, filed Apr. 11, 1983, and entitled "Super Setter Plastic Fishing Hook."

BACKGROUND OF THE INVENTION

This invention relates to the field of fishing, and it more particularly relates to a unique fishing hook.

DESCRIPTION OF THE PRIOR ART

The art of fishing using a line and hook is ancient. Multitudes of hooks have been used and constructed from materials ranging from carved bones, metals and even modern plastics. In most cases, the design of the hook was an overkill, i.e., the hook was the strongest part of the fishing system. Naturally, this design concept has caused many a fisherman to loose his tackle by hooking a snag. A strong pull by the fisherman, if it did not retrieve the snag, usually led to the line breaking somewhere along its length.

The design of the hook has been to prevent bending or uncurving of the bent part which connects the barbed point to the body secured to the fishing line. Although hooks have been proposed with flexible bends, they always prevented straightening and insured an inwardly curved motion to insure better hook setting results. Naturally, a self setting hook always holds the tightest to a snag, etc.

It has been found that a strong rigid hook i.e., a heavy steel hook, does not always insure a hooked fish, even a fish that strikes very hard. The rigid hook causes a tensioning effect on the fishing line and unless its barbed point drives cleanly home in the cartilage of the fishes mouth, slight slippage of the point causes the hook to "spring" from the mouth and results in a lost fish. Thus, a hook that has a shock absorber action in firmly but not rigidly pressing the barbed point in the fishes mouth would be better than a cast iron-rigid hook. Also, this spring action allows less tear in the fishes mouth which is particularly important when releasing a caught fish or if one "gets off the line."

It is the purpose of this invention to provide a unique fishing hook that releases from a snag before breaking the fishing line but yet "hooks" a fish better than steel hooks.

SUMMARY OF THE INVENTION

In accordance with this invention, there is provided a unique fishing hook formed of a monolithic molded member. The hook has an elongated body of uniform cross-sectional area with a connection at one end part for receiving the fishing line. A looping reverse curved part having a cross-sectional area not greater than the body connects the body at its other end with a barbed point. The barbed point penetrates encountered animal forms in the direction of the connection part. If the hook becomes caught on an obstruction, the barbed point will deflect outwardly from the body to straighten out the looping curve part so as to release the barbed point from the obstruction prior to the line pulling force reaching the rated fishing line strength.

In one embodiment of the invention, the hook is constructed so that in a relaxed state the barbed point is inclined at a small angle, toward the line of action of the body but when placed under tension, the barbed point will be deflected outwardly to n ear parallel the line of action of the body, for optimally penetrating animal forms. This outward deflection occurs when the line pulling force approaches about 85% of the force required to release the barbed point from an obstruction. In an alternate embodiment, the barbed point will reach the parallel position when the line pulling force reaches a predetermined level within the range of 25 to 75% of the rated fishing line strength for which the hook is designed. This force level is less than the force required to free the barbed point from an obstruction. In either embodiment, the small angle of the barbed point is preferably about 4 degrees and the barbed point is of the nail point type.

In yet another embodiment, the barbed point, in a related state, is parallel with the line of action of the body and will be deflected outwardly when a snag is encountered and the line pulling force reaches a predetermined level less than the rated strength of the fishing line connected to the hook.

DESCRIPTION OF THE DRAWINGS

FIG. 8 is a side view in elevation of an alternative embodiment of the present fishing hook;

FIG. 9 is a frontal view, partly in elevation and partly in cross-section of the fishing hook of FIG. 8;

FIG. 10 is a cross-sectional view of the fishing hook along plane 10—10 of FIG. 8;

FIG. 11 is a cross-sectional view of the fishing hook along plane 11—11 of FIG. 8;

FIG. 12 is a cross-sectional view of the fishing hook along plane 12—12 of FIG. 8;

FIG. 13 is a cross-sectional view of the fishing hook along plane 13—13 of FIG. 8.

FIG. 14 is an elevation showing the embodiments of the present fishing hook with two looping curved portions.

In these drawings, the several embodiments have common elements in the present fishing hook. In regard to these figures, like elements will carry like reference numerals to simplify description of the present invention in fishing hooks.

DESCRIPTION OF PREFERRED EMBODIMENTS

Figure 1:
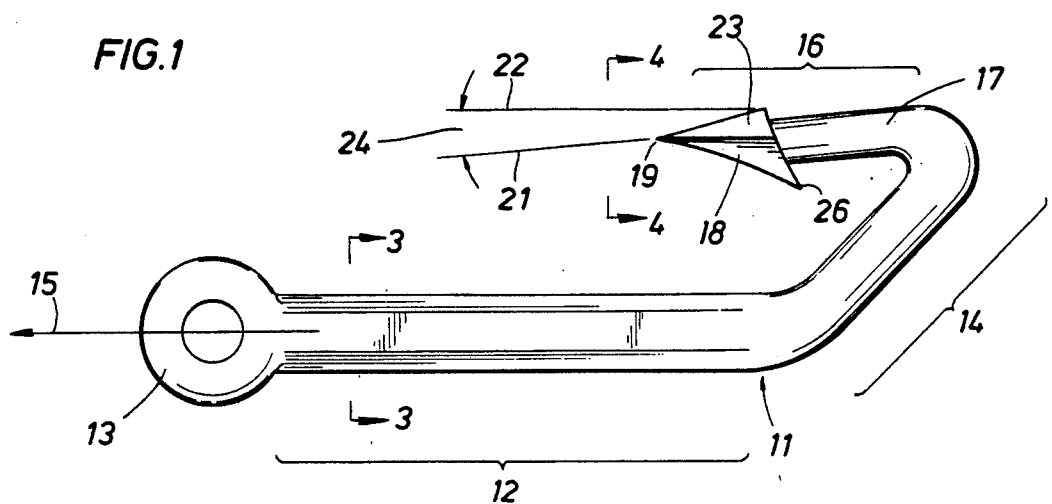
FIG. 1 is an elevation showing the preferred embodiment of the present fishing hook.
Figure 2:
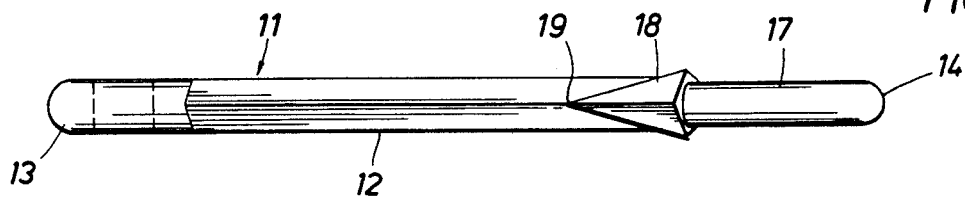
FIG. 2 is a plan of this fishing hook.

Referring to FIGS. 1 and 2, there is shown a fishing hook 11 constructed in accordance with the present invention. The hook 11 is a monolithic molded plastic member which can be formed in metal dies under high pressure and temperature molding from thermoplastics such as Xytel 330 or Rynite 35S, both trademarks of Dupont plastics. For example, the hook 11 can be molded at 550° F. and 8000 psi conditions in steel cavity molds.

The hook 11, although monolithic, has a unique shape and cross-sectional relationship between its several parts to produce the novel results priorly listed and more fully discussed hereinafter.

Figure 3:
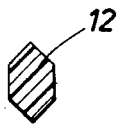
FIGS. 3 and 4 are a cross-section and an end view along lines 3—3 and 4—4, respectively, of the fishing hook shown in FIG. 1.
Figure 4:
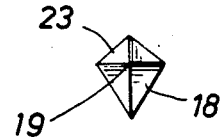

The hook 11 has a body 12 of uniform cross-sectional area. Although the cross-section of the body 12 may be of any structural shape capable of producing the desired results, it is preferred that the cross-sectional shape be ellipsoidal, as is shown by reference to FIG. 3. The body 12 with this uniform cross-sectional shape provides an elastic beam which can deflect between its ends to a uniform curvature upon being subjected to a load proportional to its bending movement.

An eye 13 is formed at one end of the body 12, and a fishing line can be attached to it. The pulling force of this line acts along a line-of-action 15 passing longitudinally through the body 12. Naturally, this acting force on the hook 11 produces both the bending movement and tension across the body 12.

The body 12, at its other end remote from the eye 13 connects with a looping curved part 14 that forms a reverse curved shape and connects to a barbed point 16. The part 14 has a uniform cross-sectional shape like the body 12, but its cross-sectional area is not as great as the body. There is a preferred relationship between these cross-sectional areas of these parts that will be described hereinafter. If a great enough force is applied to the hook, such as when an obstruction is snagged, the curved part 14 will straighten out sufficiently to release the barbed point 16 from the object.

The barbed point 16 has a shank 17 connected with the curved part 14 and an end formed into a head 18 ending at a sharp point 19. The shank 17 preferably has an ellipsoidal cross-sectional shape but is smaller in area than the adjacent end of the curved part 14. The barbed point 16 has penetration axis 21 residing in a plane common to the body and curved part and extending lengthwise from the sharp point 19, through the shank 17 into the end of the curved part 14. In a relaxed state, the penetration axis 21 of the barbed point 16 may be parallel to line-of-action 15 or may be inclined towards or away from the line-of-action by no more than a small angle. In the embodiment illustrated in FIGS. 1-7, the penetration axis is shown inclined toward the line-of-action by a small angle 24. In this embodiment, good results are obtained when this small angle 24 is less than 7.5 degrees, and best results occur with the small angle 24 about 4 degrees.

It will be apparent that the hook 11 molded as a thermoplastic member has certain flexural properties. As the pull of the fishing line increases along the line-of-action 15, the barbed point 16 will exert a counter force on a hooked object such as a fish. The barbed point 16 is deflected outwardly decreasing the small angle 24 towards zero. The cross-sectional areas of the body 12, curved part 14 and barbed point 16 are adjusted in relative beam strength that the small angle 24 becomes zero when the fishing line pulling force approaches about 80–85 percent of the total pulling force along the line-of-action 15 required to straighten out the curved part 14 and release the barbed point 16 from the engaged object. This relationship of cross-sectional areas, for this unique result, can be defined by complex mathematical relationships but they can be as easily determined by cut-and-try testing of the hook 11 and then adjusting the cross-sectional area relationships.

As the barbed point 16 becomes parallel to the line-of-action 15, its penetration ability on fish members (flesh and cartilage) reaches an optimum. Thus, the heavier fish on a given hook construction will get the best penetration by the barbed point 16.

The head 18 should be designed to not only give good penetration performance, but only to lock into the fish when penetration is effected. Good results are obtained when the head is formed as a nail point type with several plane or concave surfaces 23 merging at the point 19. Preferably, the inward ends of the surfaces 23 extend beyond and below (as at 26) with shank 17. Thus, once the head 18 passes through the flesh, the outwardly extending surfaces prevent withdrawal of the barbed point 16.

Figure 6:
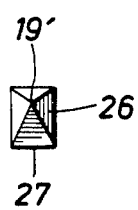
FIGS. 5 and 6 are elevational and end views, respectively, of an alternate barbed point used on the fishing hook shown in FIG. 1.
Figure 5:
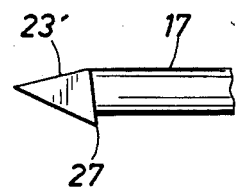

If desired, the head 18 can be of other design types, such as the pyramidal shape shown in FIGS. 5 and 6 on the head 18'. In this construction, the head 18' has trapezoidal arranged flat surfaces 27 merging to point 19' and with the inward surfaces 28 extending below the shank 17 to form the flesh lock function.

Preferably, the hook 11 is constructed so that for a given fishing line strength, the curved part 16 will deflect or straighten out to release the hook from an obstruction at a magnitude of fishing line pull of 90–95 percent of the test breaking strength of the line. For example, a 15 pound test nylon monofilament fishing line is to be used with the hook 11. In this case, the curved part 14 will deflect to release the barbed point 16 at about 13.5 pounds pull on the hook 11. For this hook 11, the barbed point 16 is deflected into parallel with the line-of-action 15 when the line pulling force is about 11 pounds. With this arrangement of the hook 11, it will catch fish efficiently of the magnitude on 15 pound test line in a sportsmanlike manner. If a limb or other snag is snared or hooked, the hook 11 can be pulled free, and there is no loss of equipment through broken tackle, line or hook which quickly reassumes its relaxed state shape shown in FIGS. 1 and 2.

Figure 7:
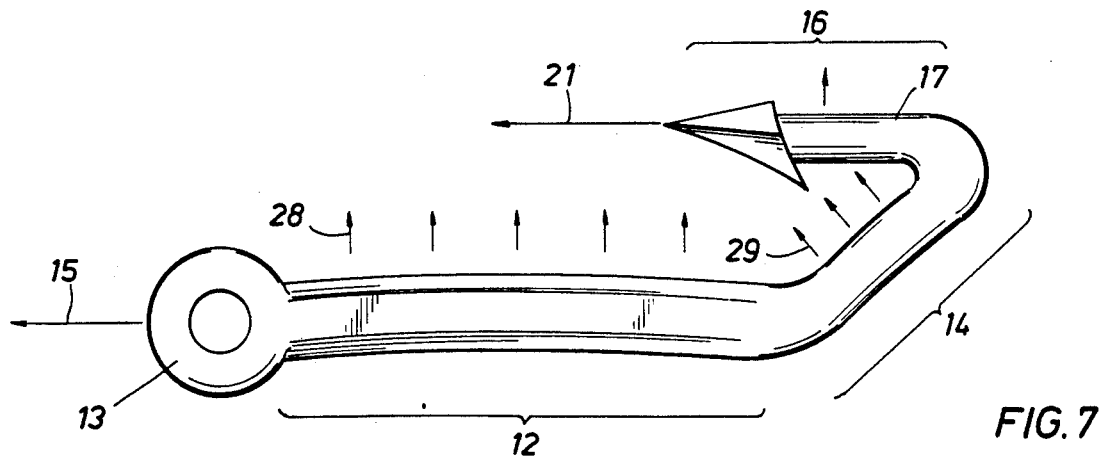
FIG. 7 illustrates the beam loading effects upon the fishing hook of FIG. 1 for maximum penetration by its barbed point.

The functioning of the hook 11 can be understood by viewing FIG. 7. The hook 11 is shown with the barbed point 16 secured with the point 19 against a restraint surface (not shown). The line pull along the line-of-action 15 is of a magnitude to reduce the small angle 24 to zero and the penetration line 21 falls on the line 22.

At this condition the body 12 as an elastic beam, assumes a uniform radius of curvature through lateral deflection indicated by the arrows 28. Likewise, the curved part 14 is bent into a slightly greater curvature through lateral deflection indicated by the arrows 29. It will be apparent that this deflection of the body 12 and curved part 14 is induced flexure by design relationship of the respective cross-sectional areas (i.e., their bending movements).

If the line force were varied, as by a fighting fish, the hook 11 responds by variations in beam flexure which is a shock absorber function. As a result of this function, the barbed point 16 is held with its point 19 against the encountered surface and does not tend to slip loose as does a hard, less resilient steel hook.

It will be apparent that a superior performing hook 11 is described, but also a hook that can be designed to pull free of a snag, etc., at some line pull less than the tensile strength of the fishing line. Then the hook 11 snaps-back to its relaxed state shape ready for a new fishing encounter.

Now referring to FIGS. 8 and 9, there is shown a fishing hook 111, comprising a further embodiment of this invention, and constituting a monolithic molded plastic member which can be formed of the materials and under the conditions hereinabove described for the embodiment shown in FIGS. 1 and 2. The hook 111 includes body portion 112 of uniform cross-sectional area obround in profile, as shown in FIG. 12. An eye 113 is formed at one end of the body 12 and a fishing line can be attached to the hook as previously described. The pulling force acts along the line of action 115 passing longitudinally through body 112. At its other end, the body 112 connects with a looping curved portion 114 that forms a reverse curved shape and connects to a barbed point 116. The part 114 has a uniform obround cross-sectional shape corresponding to, but smaller than, that of body 112. Shank 117 connects the curved part 114 with the barbed point 116. The shank 117 preferably has a circular cross-sectional shape, smaller in area than the adjacent end of the curved part 114.

As in the previous embodiment, the head 118 is formed as a nail point type head with several plane or concave surfaces 123 merging at point 119. Preferably the inward ends of the surfaces 123 extend beyond and below (as at point 126) with shank 117. Thus, once the head 118 passes through the flesh, the outwardly extending surfaces prevent withdrawal of the barbed point 116. In a relaxed state, the barbed point 116 has a penetration axis 121 extending lengthwise from the sharp point 119, through the shank 117 into the end of the curved part 114. The penetration axis 121 resides in a plane common to the body and, in the illustrated embodiment, is inclined at the small angle 124 to the line of action 115 passing longitudinally through the body 112. Good results are obtained when the small angle 124 is less than 7.5° and best results occur when the small angle 124 is about 4°. As in the previous embodiment of the invention, the penetration axis could, if desired, be positioned parallel to the line-of-action 115, or even inclined away therefrom at a slight angle, with equally effective results.

Table A represent the International Game Fishing Association (IGFA) standards for adjusting the drag on a fishing line for a particular line strength.

TABLE A

| # | IGFA Line Class | Recommended Strike Setting | Full or Max. Setting |
|---|---|---|---|
| 12H | 12 | 3–5 lbs. | 6–8 lbs. |
| 30 | 20 | 4–7 lbs. | 10–12 lbs. |
| 50 | 30 | 7–10 lbs. | 15–18 lbs. |
| 50W | 50 | 12–17 lbs. | 21–26 lbs. |
| 80 | 50 | 12–28 lbs. | 21–26 lbs. |
| 80W | 80–80 | 30–45 lbs. | 35–40 lbs. |
| 130 | 130 | 35–40 lbs. | 55–65 lbs. |

In the embodiment shown in FIGS. 8–13, for a given IGFA line class, the size of the hook and the relative cross-sectional areas of body 112, curved part 114 and shank 117 may be adjusted so that the small angle 124 becomes zero when the fishing line pulling force approaches a predetermined value within the range between the recommended IGFA strike setting and the full maximum setting. In other words, the small angle 124 becomes zero between 25% and 75% of the rated (breaking) line strength for which the hook is designed. Preferably, the small angle becomes zero at the values listed under Strike Setting for a certain IGFA Line Class in Table A. Then, the 5 lbs. value for decreasing the angle 124 to zero is suitable for both 12 and 20 lbs. IGFA line classes.

The embodiment shown in FIGS. 8–9 also exhibits shock absorbing functions as previously described for the embodiment shown in FIGS. 1–7, wherein the flexure of the body 112, curved part 114 and shank 117 assist the barbed point 116 in resiliently penetrating a fish.

In the above discussions, it has been assumed that the barbed point of the fishing hook has encountered the obstruction. However, it is possible for a small diameter submerged tree limb, etc., to slip past the barbed point and contact the fishing hook in the curved portion connecting the body with the shank. The size of the hook and the relative cross-sectional area of the body curved part and shank are adjusted so that the curved portion will straighten out and release the hook when the line pulling force reaches a predetermined level with the IGFA Full or Maximum Setting given in Table A. Preferably, the hook is also constructed so that at the same time the hook will be released from an obstruction on the barbed point when the line pulling force reaches a predetermined level within the IGFA recommended strike setting given in Table A, or approximately one-third ($\frac{1}{3}$) of the force required to straighten out the hook when pulling on the curved part.

Referring now again to FIGS. 8–13, a pair of spurs 125 are formed at the top of head 113 at oblique angle to the line of action 115 and are commonly referred to as a "cat's head." When a hook of the present invention is used with artificial bait, such as a plastic worm, the bait is commonly impaled upon the hook with a portion of the bait extending lengthwise in surrounding relation to body 112 and impaled a second time on barbed point 118. During casting or over time, the bait may shift or slip off of the hook. The spurs 125 prevent this slippage by firmly engaging the bait adjacent the eye 113. Although two spurs are shown, this part of the invention may be employed with only one spur or more than two spurs, with equal effectiveness. Also, the spurs may be located at other locations on the hook, such as along body portion 112.

As illustrated in FIG. 14, it is within the spirit and scope of this invention to construct a fishing hook employing a common body and two, three or more curve parts, shanks and barbed points depending from the common body. The structure of a multiple barbed point embodiment is, in all other respects, as described hereinabove and shown in FIGS. 1–13. The barbed points may be positioned equidistant from each other, or in other configurations as may be found to be advantageous. The flexural properties of each segment of the hook corresponds to the various embodiments of the single fishing hook hereinabove described.

Importantly, in both embodiments, the present hook becomes an integrated part of the fishing system for novel results as compared to the strongest part (overkill) design of the conventional fishing hook made of metal.

Although the hook is shown with an eye to receive the fishing line, the connection can be provided by a socket or even an adhesive or thermoweld connection to the fishing line.

From the foregoing, it will be apparent that there has been provided a novel hook for fishing. It will be appreciated that certain changes or alterations in the present hook may be made without departing from the spirit of this invention. These changes are contemplated by and are within the scope of the appended claims which define the invention. Additionally, the present description is intended to be taken as an illustration of this invention.

What is claimed is:

1. A fishing hook formed as a monolithic molded plastic member for supporting fishing bait, said hook comprising:

(a) an elongated body of uniform cross-sectional area and having a line of action extending longitudinally therethrough;

(b) a connection part adapted to connect with a fishing line at one end of said body;

(c) one or more spurs mounted on said connection part extending outwardly therefrom inclined obliquely with respect to the line of action of said body for securing fishing bait to the hook;

(d) a looping curved part forming reverse curve connecting said body to a barbed point;

(e) said barbed point adapted for penetration of an encountered animal form in the direction of said connection part;

(f) said barbed point having a penetration axis residing substantially in a plane common to said body;

(g) said looping curved part having a cross-sectional area not greater than said body;

(h) said cross-sectional areas of said body and said looping curved part adjusted in relative beam-strength whereby the total line pulling force required to straighten out said looping curved part and release said barbed point from an engaged object such as an animal form is approximately 95% of the tensite strength of the fishing line secured to said connection part and whereby said penetration axis of said barbed point is deflective outwardly past parallel with said line-of-action when the line pulling force at said connection part approaches a predetermined level less than that required to straighten out said looping curved part and release said barbed point from an engaged object.

* * * * *